United States Patent [19]

Moody et al.

[11] Patent Number: 5,203,938
[45] Date of Patent: Apr. 20, 1993

[54] METHOD AND APPARATUS FOR FORMING AN APEX FILLER AND/OR APPLYING AN APEX FILLER TO A BEAD RING SUB-ASSEMBLY

[75] Inventors: Dale R. Moody, Dana Point; Robert A. Cronin, Irvine, both of Calif.

[73] Assignee: Heico Aluminum Products, Inc., Akron, Ohio

[21] Appl. No.: 791,043

[22] Filed: Nov. 12, 1991

Related U.S. Application Data

[62] Division of Ser. No. 648,898, Jan. 31, 1991, Pat. No. 5,100,497.

[51] Int. Cl.$^5$ .............................................. B29D 30/50
[52] U.S. Cl. .................................. 156/136; 156/212; 156/229; 156/304.1; 156/304.5
[58] Field of Search .............. 156/130.7, 136, 196, 156/212, 229, 304.1, 304.5, 422; 264/177.17, 280, 310, 281, DIG. 67; 425/366; 245/1.5

[56] References Cited

U.S. PATENT DOCUMENTS

| 2,654,124 | 10/1953 | Layte | 425/320 X |
| 3,019,475 | 2/1962 | Smith | 425/366 X |
| 3,912,440 | 10/1975 | Koss et al. | 425/366 X |
| 4,265,607 | 5/1981 | Kläy | 425/366 X |
| 4,554,713 | 11/1985 | Chabal | 425/366 X |
| 4,808,357 | 2/1989 | Bourcier et al. | 425/377 X |
| 4,882,006 | 11/1989 | Seki | 156/504 |

Primary Examiner—Michael W. Ball
Assistant Examiner—Francis J. Lorin
Attorney, Agent, or Firm—McDermott, Will & Emery

[57] ABSTRACT

The present invention provides a method and apparatus for forming an apex filler (13). The invention also provides a method and apparatus that is uniquely adapted for applying an apex filler (13) onto a bead ring subassembly (14) without the introduction of stresses at the outer edge (50) of the apex filler (13). The apex filler forming apparatus (10) works in conjunction with an extruder (43) which presents a linear strip (42) of elastomeric material having a pre-determined cross-section. A pair of opposed, forming rollers (33) present a nip (35) therebetween. Means (36) are provided to rotate the rollers (33). Rotation of the forming rollers (33) causes the nip (35) frictionally to engage the elastomeric strip (42). The interaction between the elastomeric strip (42) and the nip (35) effects rotary motion of the elastomeric strip (42) and increases the circumferential length of the elastomeric strip (42) proportionally to the radial distance outwardly from the base (49) thereof. The apex forming mechanism (10) is operative in conjunction with an apex filler applying apparatus (11) to apply the apex filler (13) formed from the elastomeric strip (42) onto the radially outer surface (46) of a bead ring subassembly (14). Mounting chucks (21) are provided to position and rotatably support the bead ring sub-assembly (14) while the apex filler (13) is applied thereto.

4 Claims, 9 Drawing Sheets

FIG. 2

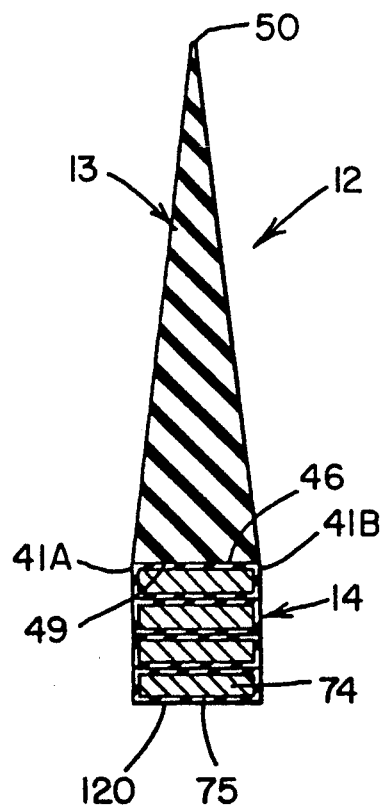
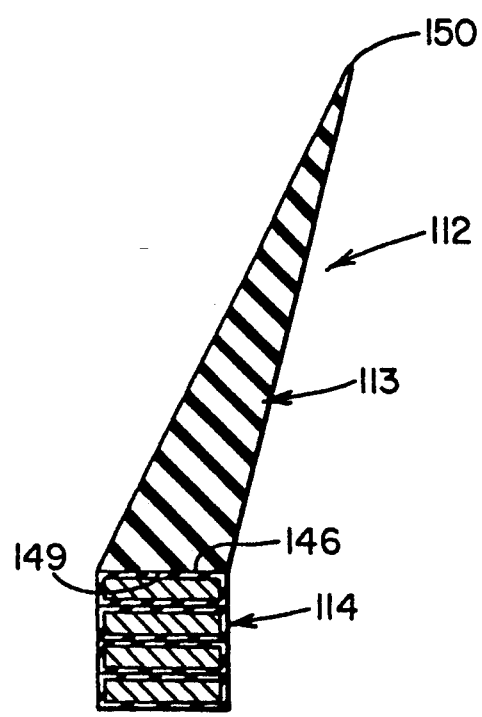

METHOD AND APPARATUS FOR FORMING AN APEX FILLER AND/OR APPLYING AN APEX FILLER TO A BEAD RING SUB-ASSEMBLY

CROSS-REFERENCE

This application is a division of application Ser. No. 07/648,898, filed Jan. 31, 1991, now U.S. Pat. No. 5,100,497.

TECHNICAL FIELD

The present invention relates to a method and apparatus for forming an apex filler and/or applying an apex filler to a bead ring for incorporation in a vehicular tire. More particularly, the present invention relates to a method and apparatus for forming an apex filler from an extruded ribbon of elastomeric material. Specifically, the present invention relates to a method and apparatus for forming a linear extrusion into an annular apex filler of the desired configuration and which may be separately, or simultaneously, applied onto an annular bead ring, also by virtue of the method and apparatus according to the present invention.

BACKGROUND OF THE INVENTION

A tire has two, laterally spaced bead portions which define the innermost diameter thereof. Each bead incorporates a metallic, ring sub-assembly which provides hoop strength and structural integrity to the bead—i.e.: the rim engaging structure of the tire. Each bead also normally includes an apex filler in addition to the metallic ring sub-assembly, because the combination assures a smooth transitional juncture between each bead and the adjacent side wall portion of the tire. To facilitate the manufacture of the tire, the ring sub-assembly and the apex filler are generally provided as a composite assembly about which the plies of the tire may be wrapped.

One prior art method of fabricating the combined ring and apex filler assembly applies a flat strip of elastomeric material along the inner circumference of a rubber coated, annular, ring sub-assembly and then encapsulates the ring sub-assembly by wrapping the strip radially outwardly about the wire ring sub-assembly. That portion of the strip which extends radially outwardly from the ring sub-assembly constitutes the apex filler. This method is fraught with difficulties, particularly in splicing the abutting ends of the wrapped strip. When the elastomeric strip is so wrapped to encapsulate the ring sub-assembly, the outer circumference of the material must stretch to accommodate the difference between the circumferential dimension of the ring sub-assembly and the circumferential dimension at the radially outer periphery of the strip. This stretching induces stresses which produce warpage in the form of dishing or scalloping along the radially outer portion of the resulting apex filler. This warpage is not constant from filler to filler, and it therefore increases the difficulty of maintaining quality control between successive tires employing bead assemblies made by this method.

Another known method of assembly applies an apex filler strip to a rotating bead ring until the starting point of the apex filler strip is adjacent the point at which the apex filler strip was first applied to the bead ring—approximately one revolution—at which time the apex filler strip is severed. The combined ring and apex filler assembly is then moved to a second processing station where a gripping and stretching apparatus engages the apex filler to close the ends. This also results in stretching the radially outer circumference of the apex filler strip more than that portion of the filler strip which has been joined with the bead ring. This stretching causes the same distortion problems inherent to, and as described in conjunction with, the previously discussed prior art method.

SUMMARY OF THE INVENTION

It is, therefore, a primary object of the present invention to provide an improved method and apparatus for forming an elastomeric strip into an apex filler of substantially annular configuration without inducing distortion to the resulting apex filler.

It is another object of the present invention to provide an improved method and apparatus for forming an apex filler, as above, by working a strip of elastomeric material within the nip presented by opposed forming rollers to produce a substantially annular apex filler.

It is a further object of the present invention to provide an improved method and apparatus for forming an apex filler, as above, by working a linear strip of extruded, elastomeric material within the nip presented by opposed forming rollers to produce a substantially annular apex filler.

It is a still further object of the present invention to provide an improved method and apparatus for forming an apex filler, as above, which may also be employed to apply the apex filler onto an annular bead ring during the process of forming the apex filler.

It is yet another object of the present invention to provide an improved method and apparatus for manufacturing and applying an apex filler, as above, to an annular bead ring wherein the circumference of the elastomeric strip being formed into the apex filler is progressively lengthened relative to the increasing radius thereof by virtue of the interaction between the elastomeric strip and a pair of angularly opposed forming rollers, while the apex filler is being simultaneously applied to the outer periphery of the annular bead ring.

It is an even further object of the present invention to provide an improved method and apparatus for manufacturing and applying an apex filler to an annular ring sub-assembly wherein the ring sub-assembly is rotatably mounted on a chuck assembly having selectively adjustable rollers to support the bead ring and also wherein a generally triangular, elastomeric strip is extruded into a nip having the configuration desired for the apex filler, the nip being presented between a pair of rotating frustoconical rollers that engage the elastomeric strip at a progressively increasing linear speed between that portion of the apex filler which engages the bead ring and the radially outermost extremity of the apex filler.

These and other objects of the present invention, as well as the advantages thereof over existing and prior art forms, which will be apparent in view of the following detailed specification, are accomplished by means hereinafter described and claimed.

In general, the present invention provides a method and apparatus for forming an apex filler, and which method and apparatus may also be uniquely adapted for applying an apex filler onto a bead ring without the introduction of stresses at the outer edge of the apex filler. Apparatus embodying the concepts of the present invention for forming an apex filler preferably works in conjunction with an extruder which presents a linear strip of elastomeric material having a generally triangular cross-section with a base and a pair of converging sidewalls. A pair of opposed, frusto-conical forming roller means present a nip therebetween. Means are provided to rotate the frusto-conical forming roller means. Rotation of the forming roller means allows the nip frictionally to engage the elastomeric strip that is fed into the nip. The interaction between the elastomeric strip and the nip effects rotary motion of the elastomeric strip and increases the circumferential length of the elastomeric strip proportionally to the radial distance outwardly from the base thereof.

The aforesaid apparatus permits an apex filler to be formed according to a method whereby a linear, elastomeric strip having a base and a pair of sidewalls which converge from the base to an apex is extruded. The sidewalls of the elastomeric strip are engaged with a nip presented by a pair of opposed, frusto-conical rollers. The rollers are rotated to work the elastomeric strip within the nip and thereby effect rotation of the base at a first linear speed, the apex at a second and greater linear speed and the sidewalls at linear speeds substantially proportional to the distance from the base to the apex.

One exemplary embodiment of the apparatus, which embodies the concepts of the present invention and which is adapted for use in the manufacture of bead ring assemblies for eventual use in tire making is deemed sufficient to effect a full disclosure of the subject invention, is shown by way of example in the accompanying drawings and is described in detail without attempting to show all of the various forms and modifications in which the invention might be embodied; the invention being measured by the appended claims and not by the details of the specification.

BRIEF DESCRIPTION OF THE DRAWINGS

FIG. 2 is an enlarged, frontal elevation of the apparatus depicted in FIG. 1;

FIG. 10 is an enlarged section taken substantially along line 10—10 of FIG. 9; and, FIG. 11 is a view similar to FIG. 10 but depicting an alternative disposition at which the apex filler may be applied to a bead ring in accordance with the concepts of the present invention.

DESCRIPTION OF AN EXEMPLARY EMBODIMENT

Figure 9:
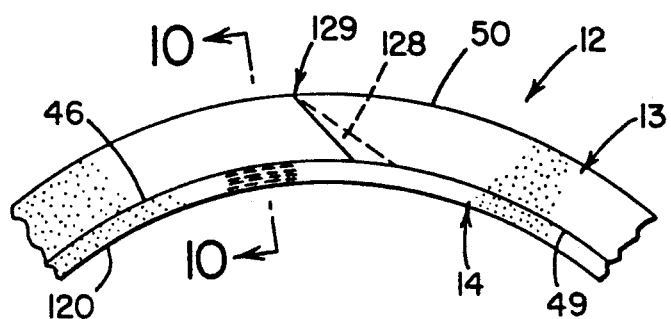
FIG. 9 is a partial side elevation of a tire bead assembly which comprises a bead ring sub-assembly to which an apex filler has been applied according to the method, and by the apparatus, of the present invention.

Referring to the drawings, wherein like characters represent the same or corresponding parts throughout the several views, a novel and unique apex filler forming mechanism 10 is shown and described in combination with an apparatus 11 for assembling pneumatic tire bead assemblies 12, which apparatus employs the apex filler forming mechanism 10 to apply an apex filler 13 to a bead ring sub-assembly 14 which is best seen in FIGS. 9 and 10. The composite bead assembly apparatus, which includes the forming mechanism 10 and the apparatus 11 for applying the apex filler 13 to the bead ring sub-assembly 14 is designated generally by the identifying numeral 15. With specific reference to FIGS. 1 and 2, the bead assembly apparatus 15 rests on a base 16 from which a post 18 extends generally upwardly. A chuck supporting assembly 19 is rotatably supported on the post 18, and the chuck supporting assembly 19 presents three radially extending arms 20, each of which terminates in a mounting chuck 21.

In the detailed description which follows, a particular structural member, component or arrangement may be employed at more than one location. When referring generally to that type of structural member, component or arrangement a common numerical designation shall be employed. However, when one of the structural members, components or arrangements so identified is to be individually identified it shall be referenced by virtue of a latter suffix employed in combination with the numerical designation employed for general identification of that structural member, component or arrangement. Thus, there are at least three arms which are generally identified by the numeral 20, but the specific, individual arms are, therefore, identified as 20A, 20B and 20C in the specification and on the drawings. This same suffix convention shall be employed throughout the specification.

The chuck supporting assembly 19 is rotatable, as by motor 17, sequentially to index the arms 20 between three successive stations 22. As best presented in FIG. is located at the assembly station 22B, and arm 20C is located at the unloading station 22C. At the loading station 22A a bead ring sub-assembly 14 is installed on the mounting chuck 21A by a conventional, swing arm loading mechanism 23. At the assembly station 22B an apex filler 13 is applied to the bead ring sub-assembly 14. At the unloading station 22C the completed tire bead assembly 12 is removed from the mounting chuck 21C by a conventional, swing arm unloading mechanism 24 and placed on a storage rack, not shown.

Figure 2:
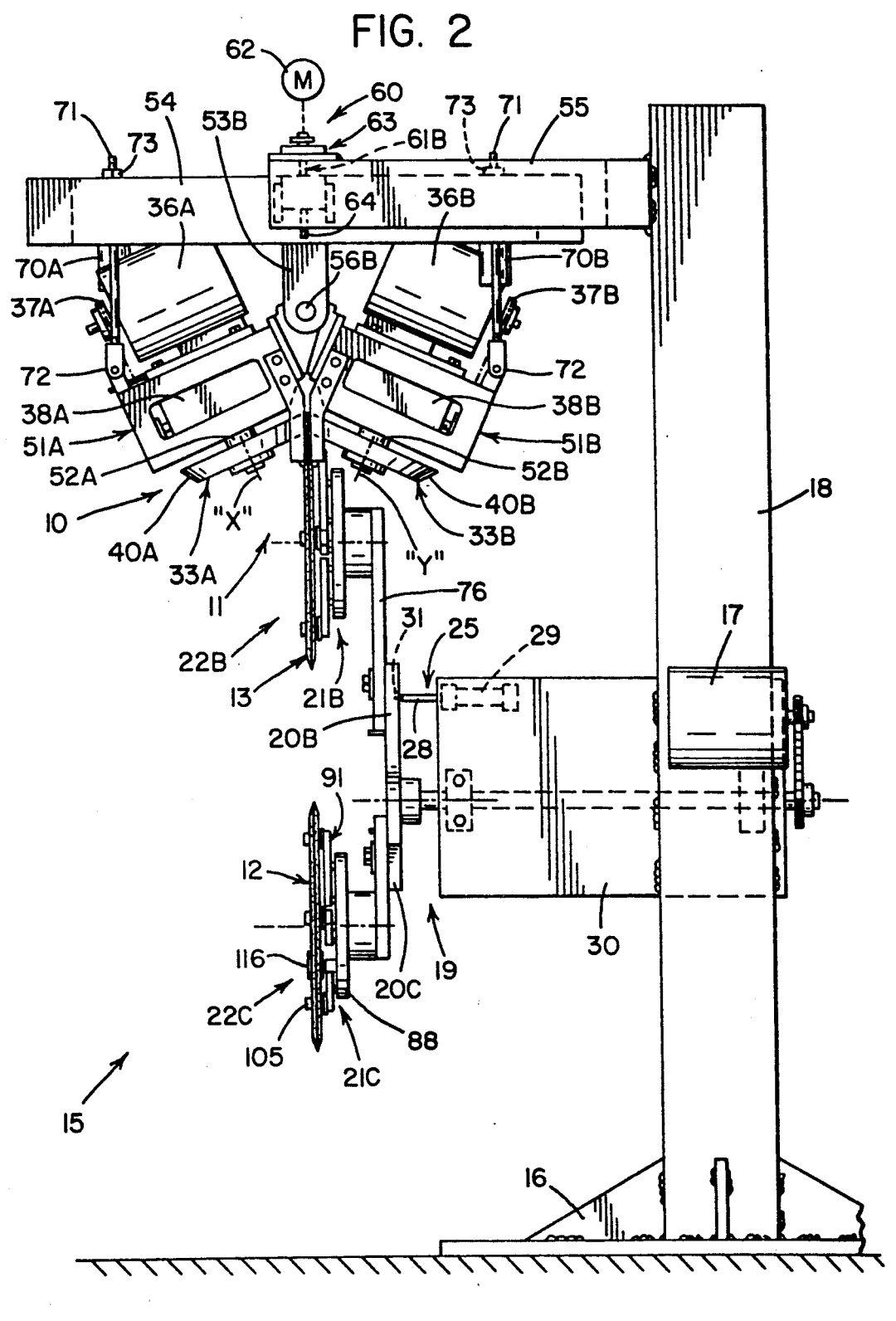
Figure 7:
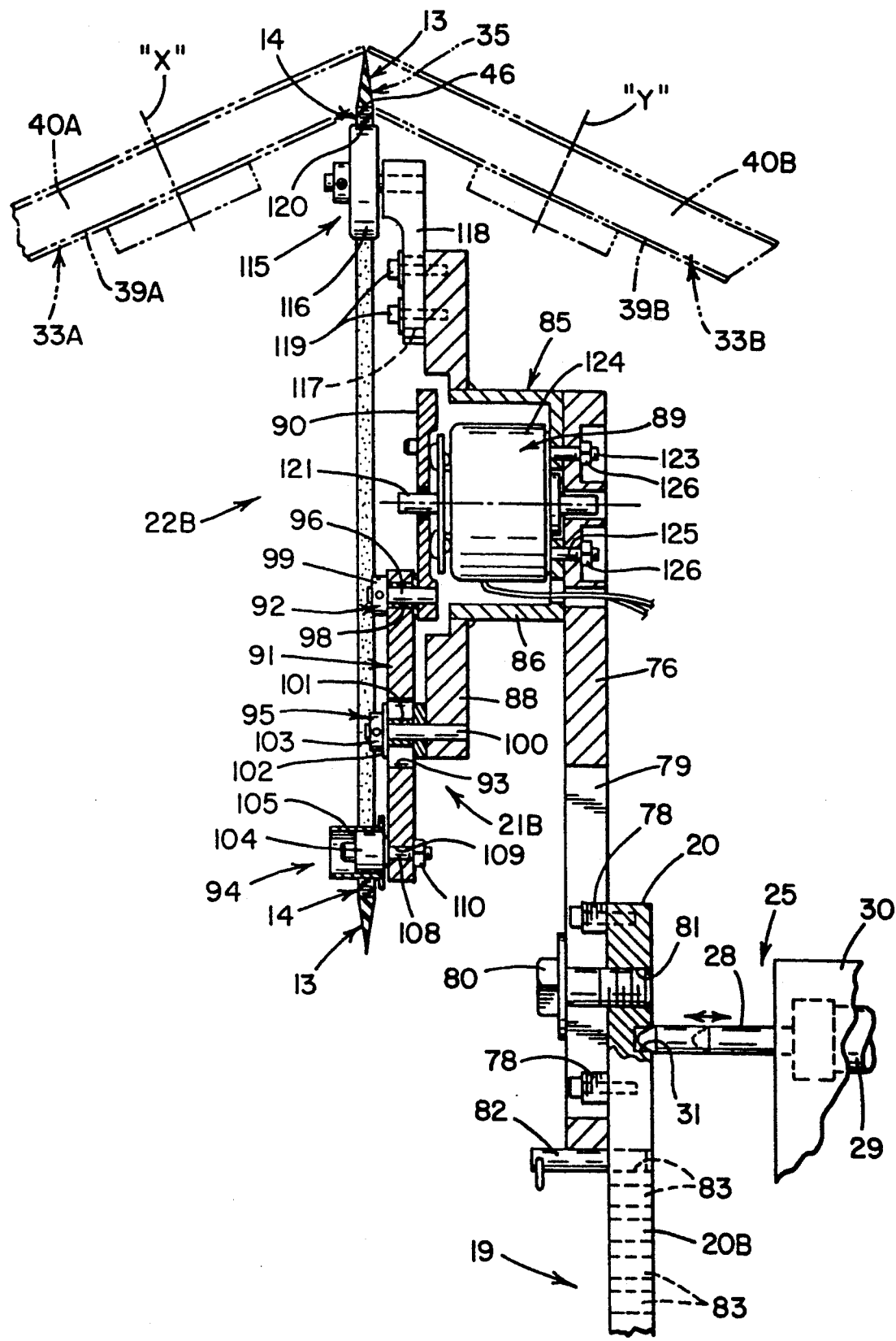
FIG. 7 is a vertical section taken substantially along line 7—7 of FIG. 6.

The radially extending arms 20 of the chuck supporting assembly 19 are maintained at the successive stations 22 to which they are indexed by locking mechanism 25. As best seen in FIGS. 2 and 7, the locking mechanism 25 includes a pin 28 and an actuator 29 presented from the cantilevered extension arm 30 which extends outwardly from the support post 18 to be received within a detent recess 31 provided in the chuck supporting assembly 19.

Accordingly, when an arm 20 is properly located at a station 22 the actuator 29 is energized, in a conventional manner, to extend the pin 28 into the detent recess 31, thereby preventing the arms 20 from inadvertently being rotated. When the procedures scheduled for each station are completed the pin 28 is retracted from the detent recess 31 by de-energizing the actuator 29, thereby permitting unimpeded rotation of the chuck supporting assembly 19.

Figure 5:
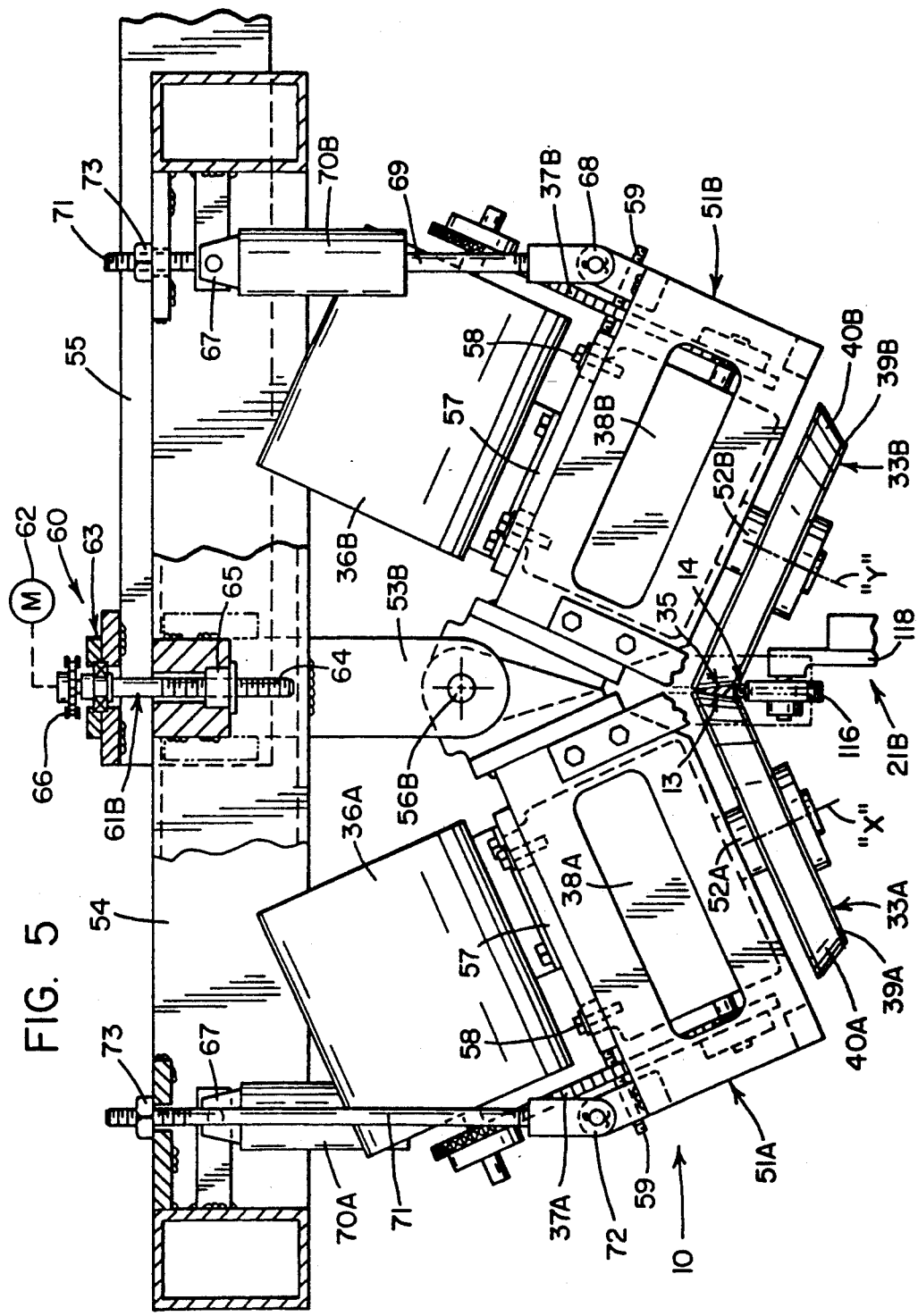
FIG. 5 is a view similar to FIG. 4 but depicting the forming mechanism in the closed position, is it would be disposed to form an apex filler, or in the embodiment depicted to form the apex filler while simultaneously applying it to a bead ring sub-assembly—as such, said view is taken substantially along line 5—5 of FIG. 1.
Figure 6:
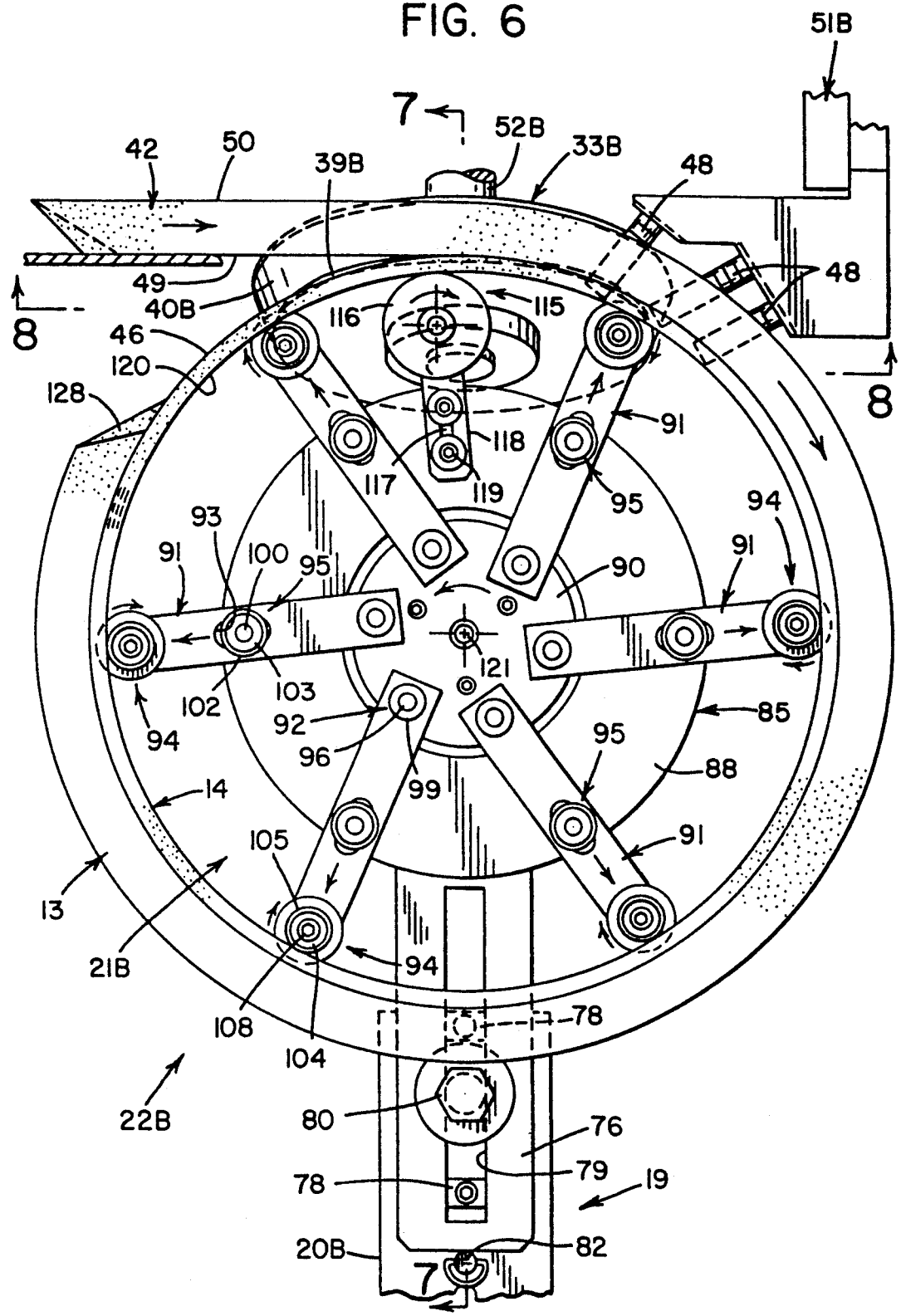
FIG. 6 is also an enlarged area of FIG. 1 but with one of the forming rollers broken away to the interaction between the other forming roller and a gripping chuck employed to present a bead ring sub-assembly to the forming mechanism.

Because an apex filler 13 manufactured according to the concepts of the present invention may constitute an article of commerce, the apex forming mechanism 10 shall be detailed before describing the apex filler applying apparatus 11 in the context of the overall, composite, bead assembly apparatus 15. Thus, when an arm 20 is disposed at the assembly station 22B, a bead ring sub-assembly 14 is supported for rotation on the mounting chuck 21B, and the bead ring sub-assembly 14 is gripped between a pair of opposed and rotatable rollers 33A and 33B which, as best seen in FIGS. 5 and 7, may be frusto-conical in shape to define a nip 35 therebetween. As will become apparent, the cross sectional configuration of the nip 35 is virtually identical with cross sectional shape to which the apex filler 13 is to be formed. Each roller 33 may be rotated by a conventional drive train which includes a motor 36, a chain drive 37 and a gear reducer 38. In the alternative, the opposed rollers 33A and 33B may be interconnected by conventional gearing to maintain the proper speed relationship therebetween while being driven by a single power source, such as an electric motor.

As shown, the nip 35 may be formed by a compound, frusto-conical outer surface on each of the opposed rollers 33A and 33B. That is, the outer surface on each roller 33 may have a first, frusto-conical portion 39 which serves grippingly to engage the radially outer corners 41A and 41B (FIG. 10) of the bead ring sub-assembly 14, and a second, frusto-conical portion 40 which serves not only to grip but also workingly to form the apex filler 13, as will be hereinafter more fully described.

With respect, first, to surface portion 39 of the roller 33 it should be appreciated that whereas the representative bead ring sub-assembly 14 is depicted as being rectilinear, it could, as well, have another geometric cross section—i.e.: hexagonal, octagonal or even circular, to mention a few. The point is that the surface portions 39 of the opposed rollers 33 should have whatever configuration is necessary to effect the necessary driving engagement with the flanks of the sub-assembly 14—those flanks being the corners 41 in the rectilinear configuration depicted.

In any event, the use of the compound, frusto-conical portions 39 and 40 on the opposed rollers 33A and 33B readily provides such cross sectional configurations for the tire bead assemblies 12 and 112 depicted in FIGS. 10 and 11, respectively. It should be appreciated, however, that the present invention is fully capable of producing apex fillers 13 having a wide variety of cross sectional configuration. To that end it must be understood that the opposed forming rollers 33 need not form the nip 35 with only conical surfaces. The nip 35 may, for example, be formed by oppositely disposed, curving surfaces, one of which may be convex and the other of which may be concave. Irrespective of the shape employed to define the nip, the opposing surfaces must be configured to provide corresponding points on each which are the same distance from the respective axes about which the forming rollers presenting those opposed points rotate. As a result, contact of the rollers with the apex filler being formed will be linear. That is, the speed of the nip surface at any point on one forming roller will be exactly equal to the speed of the corresponding point on the opposed roller so that the material between those points is not subjected to working transversely of the nip 35, and yet each successive point along the radius of each roller 33 moves at a progressively increasing rate radially outwardly of the forming rollers. In this manner substantially stress free differential elongation is maintained as the elastomeric material is formed into an apex filler of the desired cross sectional configuration.

To return to the description of the configuration for an exemplary nip 35 the frusto-conical portions 39 and 40 may well be formed as narrow cylindrical lands along the circumference of the rollers 33, if desired.

Figure 1:
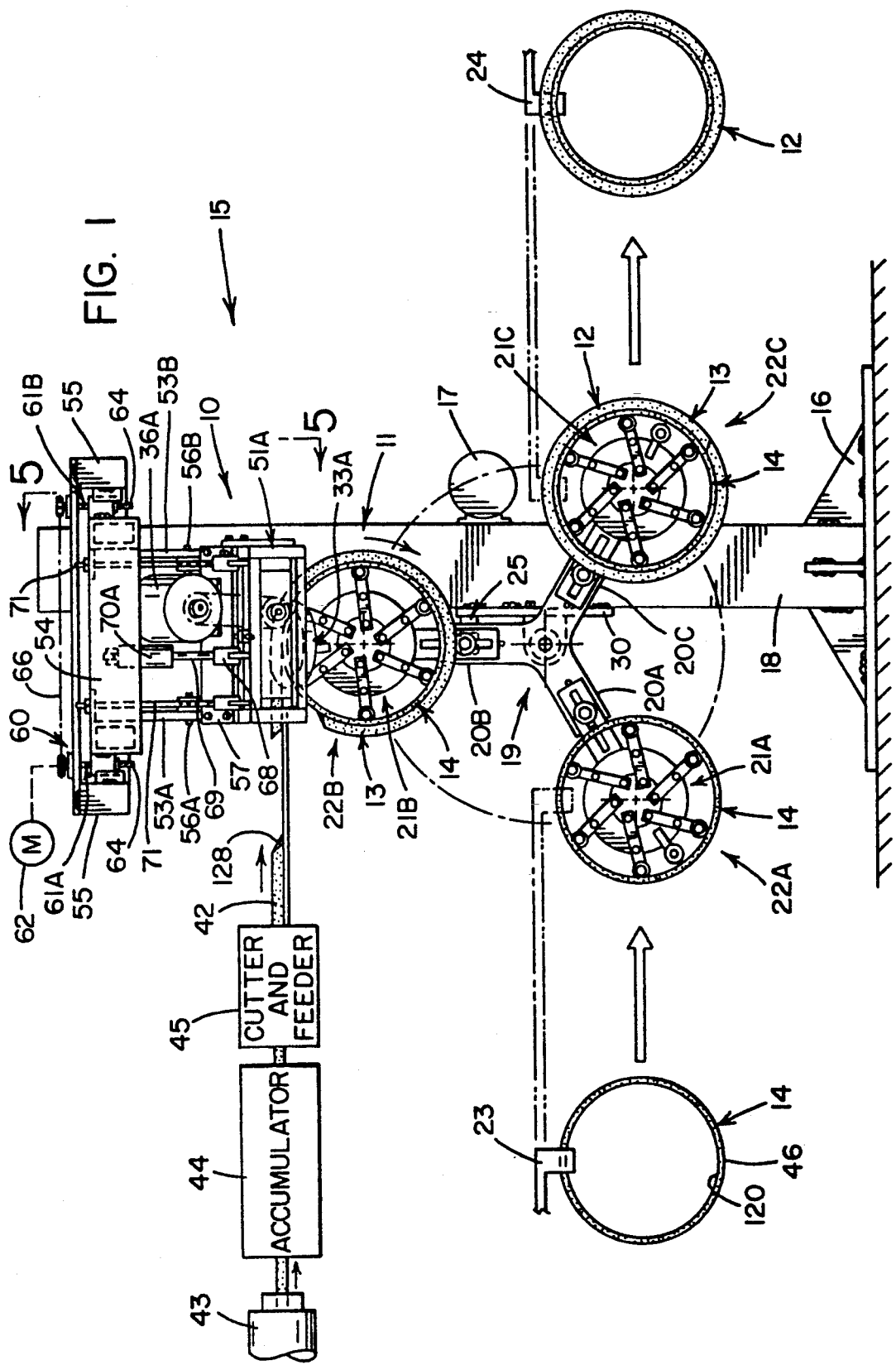
FIG. 1 is a side elevation depicting an apparatus embodying the concepts of the present invention for forming an apex filler and for applying an apex filler so formed to a bead ring sub-assembly for a pneumatic tire, the apparatus capable of being operated according to the method of the present invention.
Figure 4:
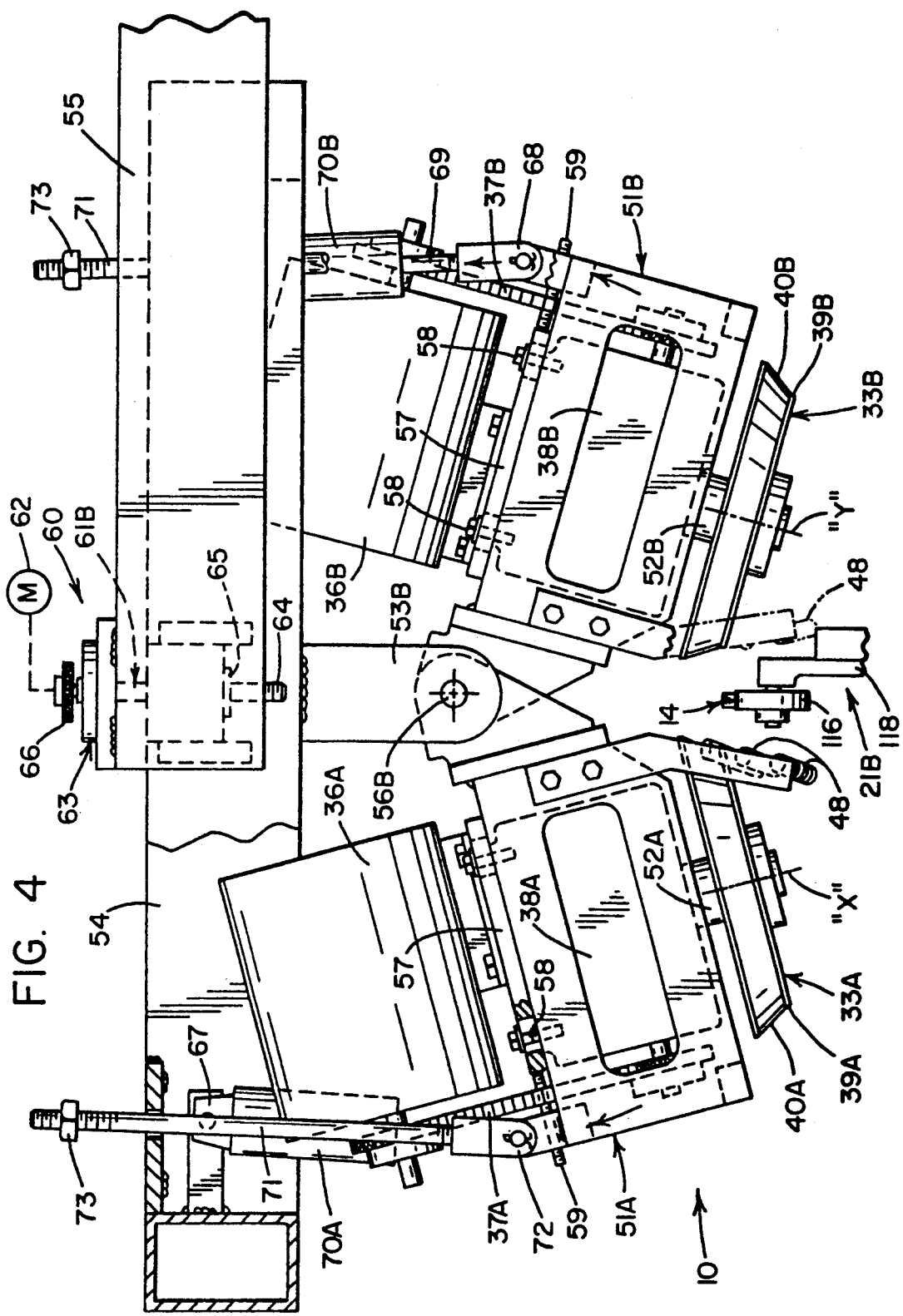
FIG. 4 is an enlarged frontal elevation of the apex filler forming mechanism depicted in FIGS. 1 and 2, the forming mechanism being shown in the open position which permits operatively positioning a bead ring sub-assembly between the opposed roller means in the forming mechanism or removing a completed apex filler or, in the embodiment depicted, removing a completed tire bead assembly.
Figure 8:
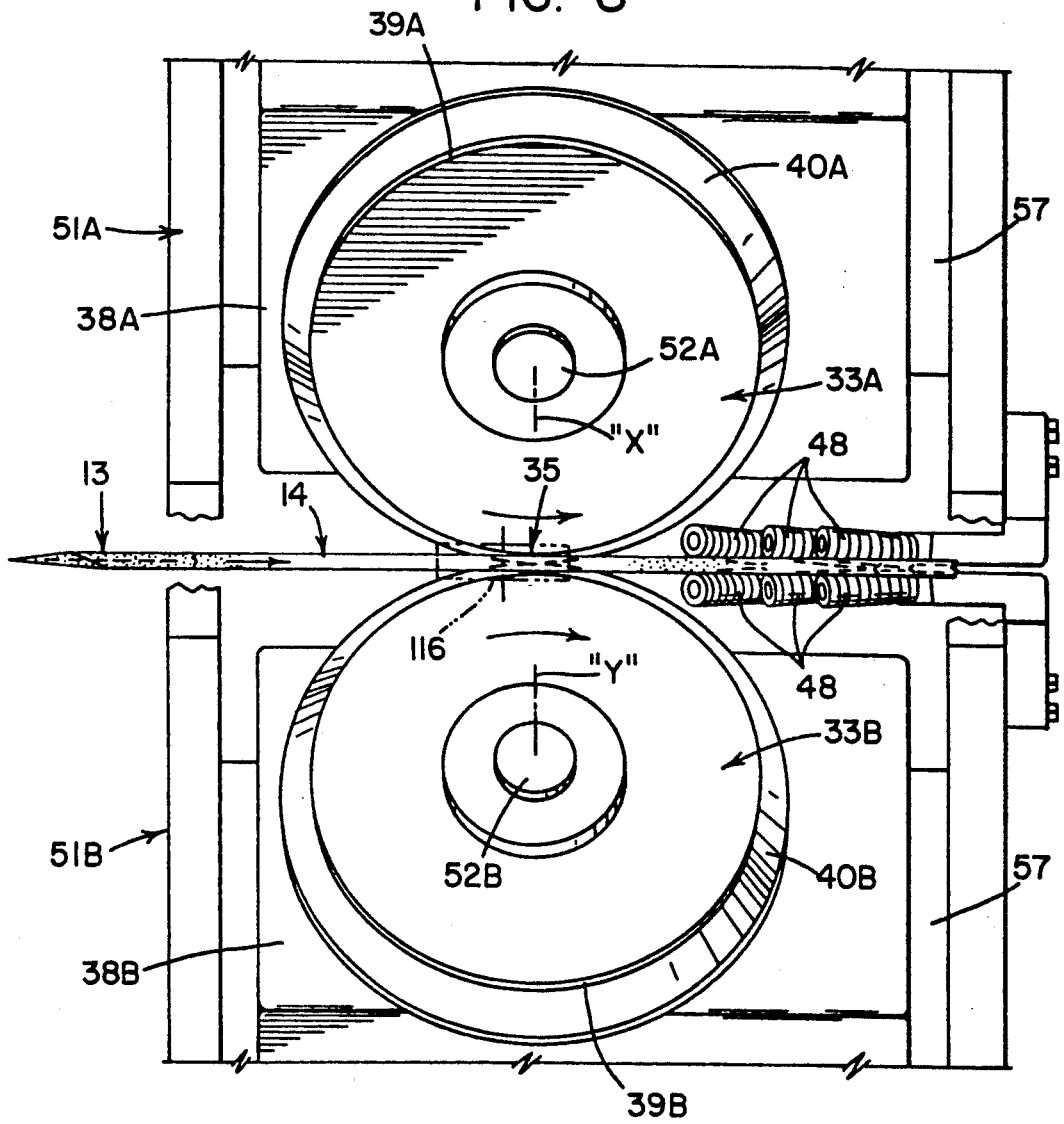
FIG. 8 is an enlarged, horizontal section taken substantially along line 8—8 of FIG. 6 to depict the forming mechanism, and particularly the rollers in bottom plan.

With continued reference to FIG. 1, an elastomeric strip 42 is forced from a conventional extruder 43 and may pass through conventional accumulators 44 and an in-flight cutter and feeder 45 which directs the strip 42 into the nip 35. After the elastomeric strip 42 is formed within the nip 35 the resulting apex filler passes between a plurality of guide rollers 48 (FIGS. 4 and 8). The rollers 48 provide guidance to the apex filler 13, thereby assuring that the base 49 thereof is maintained in alignment with the outer circumferential surface 46 (FIG. 10) of the bead ring sub-assembly 14 as they leave the nip 35. The rollers 48 may also be advantageously employed to guide the apex filler 13 out of the nip 35, even if the apex filler 13 is not simultaneously applied to a bead ring sub-assembly 14.

As the elastomeric strip 42 is worked within the nip 35 presented between the opposed rollers 33, the radial outer edge 50 of the strip 42 is forced through the nip 35 at a faster linear speed than is the base 49 of the strip 42. In fact, the differential speed of the strip 42, considered incrementally from the base 49 to the radially outer edge 50, is linear. Thus, each incremental portion of the elastomeric strip 42 from the base 49 to the radially outer edge 50 thereof is forced to travel a greater distance than the base 49 and is therefore elongated relative to the base 49. Accordingly, the circumferential dimension of the radially outer edge 50 is greater than that of the base 49 due to the forced, continuous differential elongation of the elastomeric strip 42 in the radial direction, and the linear elastomeric strip 42 which enters the nip 35 is thereby formed into an annulus with the base 49 establishing an inner circumferential surface which is tack-bonded to the outer circumferential surface 46 of the bead ring sub-assembly 14. In other words, the resulting apex filler 13 is lengthened, or permanently stretched, differentially between the base 49 and the radially outer edge 50 as the strip 42 is worked between the rollers 33. Therefore, the resulting apex filler 13 does not have the tendency to bow, buckle, fold, dish or scallop along the radially outer edge 50, as occurs with typical prior art apex fillers.

It should be understood, however, that the working does not stretch the base 49 of the elastomeric strip 42. The linear speed of the frusto-conical surfaces 39, where contact is made with the corners 41, is virtually identical with the linear speed of the immediately adjacent frusto-conical surface portions 40 on the rollers 33. Thus, there is an insufficient speed differential between the outer cylindrical surface 46 of the bead ring subassembly 14 and the base 49 of the elastomeric strip 42 to cause one to move relative to the other. Therefore, these surfaces are tack-bonded together without stresses arising therebetween.

For a more detailed description of the apex filler forming mechanism 10, the rollers 33A and 33B are mounted on respective housings 51A and 51B, and the previously identified electric motors 36, chain drives 37 and gear reducers 38 are supported from the housings 51. Drive shafts 52A and 52B extend outwardly from the corresponding gear reducers 38A and 38B to rotate the rollers 33A and 33B, respectively.

The housings 51A and 51B are pivotally supported from a pair of laterally spaced mounting arms 53A and 53B (FIG. 1) which extend perpendicularly outwardly from a positioning bracket 54 that is itself mounted for translational movement toward and away from a cantilevered supporting beam 55 that extends perpendicularly outwardly from the post 18. The pivotal support between the housings 51A and 51B and the mounting arms 53A and 53B may be effected by pin connections 56A and 56B. The translational movement of the positioning bracket 54 relative to the supporting beam 55 may be effected by apex diameter adjustment assembly 60. The apex diameter adjustment assembly 60 employs a pair of threaded members 61A and 61B which are operatively connected between the positioning bracket 54 and the supporting beam 55 and are adapted to be simultaneously driven by a conventional electric motor 62. Selective rotation of the threaded members 61 effects translational movement of the positioning bracket 54 with respect to the fixed supporting beam 55 that will raise and lower the apex filler forming mechanism 10.

As best seen in FIG. 5, the threaded members 61 are each rotatably mounted in a thrust bearing assembly 63 which is secured to the supporting beam 55. The threaded shaft portion 64 of each member 61 is matingly received within a threaded collar 65 which is secured to the positioning bracket 54. Inasmuch as the two threaded members 61A and 61B are to rotate in unison, they may be connected, as by a chain drive 66, to the single, electric motor 62.

As will become hereinafter more fully apparent, this selective positioning of the forming mechanism 10 which can thus be achieved by the apex diameter adjustment assembly 60, permits the forming mechanism 10 to be used for the manufacture of apex fillers 13 and tire bead assemblies 12 in a multitude of diameters. Typically, tire bead assemblies 12 having an inside diameter in the range of from about 13 inches (33.02 cm) to about 19 inches (48.26 cm) can be made on a single forming mechanism 10.

In order to open and close the apex filler forming mechanism 10—as required to insert a bead ring subassembly 14 and to remove a completed tire bead assembly 12, or perhaps an annular apex filler 13—one may selectively pivot the housings 51A and 51B about the pin connections 56. Specifically, a pair of drive cylinders 70A and 70B may be operatively connected between the respective housings 51A and 51B and the positioning bracket 54 to effect the aforesaid pivotal movement required to open and close the apex filler forming mechanism 10. A first clevis 67 on each cylinder 70 may be pivotally secured to the positioning bracket 54, and a second clevis 68, which is presented from the piston rod 69 extending outwardly from each cylinder 70, may be pivotally attached to the appropriate housing 51.

Control over the extent to which the forming mechanism can open and close may be effected by adjustment rods 71. One end of each adjustment rod 71 presents a clevis 72 that may be attached to one of the housings 51. The opposite end of each rod 71 may be provided with an adjustment means 73, such as a nut, that can be rotated to establish the desired length for each rod 71. The length of the adjustment rods 71 permits the apex filler forming mechanism 10 to be closed only to a predetermined extent, which results on the desired angular disposition of the opposed rollers 33, and thereby the frusto-conical surface portions 39 and 40 thereon. The drive cylinders 70 thereby serve to pivot the housings 51 of the forming mechanism 10 from the open position represented in FIG. 4 to the closed position represented in FIG. 5, and vice versa. In the open position, the housing 51 are separated sufficiently to permit the removal of an completed tire bead assembly 12 from between the rollers 33 and thereafter to permit a bead ring subassembly 14 to be positioned between the rollers 33. As best seen in FIG. 5, the adjustment means 73 engage the positioning bracket 54 to determine the extent to which the rollers 33 can approach each other in the closed position of the apex filler forming mechanism 10.

Because the apex diameter adjustment assembly 60 is capable of being opened and then closed to the degree determined by the adjustment rods 71, it is necessary to provide a means by which to effect lateral adjustment for the axes "X" and "Y" of the drive shafts 52A and 52B, respectively. This result can, for example, be accomplished by mounting each motor 36, and the gear reducer 38 associated therewith, on a slotted plate 57 that is slidable latterally along the housing 51 within which that motor 36 and gear reducer 38 is mounted. Mounting screws 58, which extend through the slotted plates 57, secure the plates 57 to the housings 51, and at least one set screw 59 serves to permit fine adjustment in the lateral position of each slotted plate 57, and thus the axes "X" and "Y" of the drive shafts 52.

The adjustments provided by the heretofore described structure permits the forming mechanism 10 to fabricate apex fillers 13 having a fairly wide range of cross sectional configurations. In addition, the aforesaid forming mechanism 10 may also fabricate tire bead assemblies 12 having a wide range of bead diameters and cross sectional dimensions without the need to interchange components. Changing the height of the apex fillers 13 is accomplished simply by exchanging rollers 33.

As is well known to the art, the bead ring sub-assembly 14 may have a number of configurations, but the drawings represent a typical construction wherein each bead ring sub-assembly 14 comprises a volute wound metallic ribbon 74 that is encased by a coating of uncured elastomeric material 75 in order to effect a joinder not only between the successively wound layers of the ribbon 74 forming the bead ring sub-assembly 14 but also between the ring sub-assembly 14 and the apex filler 13 without the need to employ special adhesives. In order to simplify the disclosure the bead ring sub-assembly 14 was depicted as having a rectilinear cross section, and the apex filler was depicted as having a cross sectional configuration of an isosceles triangle. It must be understood, however, that the present invention is not limited to that specific configuration. For example, an alternative configuration is depicted in FIG. 11. In FIG. 11 the tire bead assembly 112 utilizes an apex filler 113 having the cross sectional configuration of a scalene triangle. The base 149 of the apex filler 113 also engages the outer circumferential surface 146 of the bead ring sub-assembly 114 but the radially outer edge 150 of the apex filler 113 is laterally offset from the position it occupies in tire bead assembly 12. This tire bead assembly 112, and its components, may be manufactured with the same processes that are used to manufacture the tire bead assembly 12, and its components. The shape of the apex filler 13, or 113, is determined by the configuration, and disposition, of the frusto-conical surface portions 39 and 40 on the rollers 33. A wide range of apex fillers can be shaped by the forming mechanism 10. The ability to provide independent, angular adjustment of each housing 51A and 51B, together with the ability to select the desired cross sectional configuration of the rollers 33 will allow the apex filler to be formed within the wide range of adjustments available.

As best seen in FIGS. 1, 3, 6 and 7, each mounting chuck 21 is supported from its respective arm 20 on the chuck supporting assembly 19. Specifically, each mounting chuck has an extension arm 76 that may be attached at selective radial locations along one of the selected radial arms 20. Each extension arm 76 is maintained in the desired radial disposition relative to the arm 20 to which it is secured by a pair of alignment blocks 78 which extend perpendicularly outwardly from each arm 20 to be received within a slot 79 which penetrates the radially inner end portion of the extension arm 76. The extension arm 76 is then secured to the radial arm 20 by a fastening means in the nature of a cap screw 80 which penetrates the slot 79 to be received within a threaded bore 81 in the arm 20. The precise radial position of the extension arm 76 on the arm 20 is established by a locating pin 82 which is selectively disposed in one of a plurality of locating apertures 83 which a recessed into the arm 20. The particular locating aperture 83 selected is determined by the diameter of the apex filler and/or tire bead assembly 12 that is to be manufactured.

A chuck frames 85 is secured to the radially outer end portion of each extension arm 76. The chuck frame 85 has a cylindrical portion 86 (FIG. 7) which extends perpendicularly outwardly from the extension arm 76 and terminates in an annular intermediate ring 88. A rotary solenoid 89 may be received within the hollow interior of the cylindrical portion 86 and be anchored to the chuck frame 85 operatively to rotate a drive disk 90. Each mounting chuck 21 employs a plurality of drive arms 91, and the radially inner end of each drive arm 91 is pivotally connected to the drive disk 90, as by a collar clamp 92. The medial portion of each drive arm 91 has longitudinally extending slot 93. The radially outer portion of each extension arm 76 presents a bead ring support assembly 94 that is rotatable mounted thereon.

A collar clamp 95 is received through the slot 93 in each drive arm 91 to be anchored within the intermediate ring 88. Each collar clamp 95 provides a fulcrum and a means by which to guide the generally radially inward and outward movement of the drive arms 91, which is effected by the attachment of the inner end portion of each drive arm 91 to the drive disk 90.

As best seen in FIG. 7, each collar clamp 92 has a pin 96, a hat-shaped bushing 98 and a collar 99. The bushing 98 provides an anti-friction surface between the drive arm 91 and the pin 96 and also between the drive arm 91 and the drive disk 90. The collar 99 is mounted on the pin 96 and limits the linear motion of the drive arm 91 along the bushing 98. Each collar clamp 95 includes a pin 100, a bushing 101, a washer 102 and a collar 103. The bushing 101 provides an anti-friction interface between the drive arm 91 and the pin 100 as the drive arm 91 is moved linearly relative to the pin 100. The collar 103 and the washer 102 restrain the drive arm 91 from inadvertently disengaging the pin 100.

Each bead ring support assembly 94 is comprised of a roller 104, and a hat-shaped cover 105 that is supported on, and circumscribes, the roller 104. Each roller 104 is supported on a threaded stem 108. The threaded stem 108 extends through an aperture 109 in the drive arm 91 and is secured thereto by a fastener 110.

A positioning and support roller assembly 115 is secured to the intermediate ring 88 and extends radially outwardly therefrom. The roller 116 in the assembly 115 is mounted on an offset base 118 which is secured to the intermediate ring 88 by a pair of fasteners 119 in a manner permitting radial adjustment of the roller 116. Typically, the accommodation for this adjustment may well entail the provision of a slot 117 in the base 118 through which the fasteners 119 are received. When properly adjusted, the roller 116 is positioned at a radius such that the bead ring sub-assembly 14 will be supported thereby at the desired location relative to the nip 35. Thus, as the elastomeric strip 42 is forced into abutment with the radially outer surface 46 of the bead ring sub-assembly 14, the radially inner surface 120 of the sub-assembly 14 is supported to prevent radially inward movement thereof. Therefore, sufficient force can be exerted at the interface between the elastomeric strip 42 and the bead ring sub-assembly 14 to cause tack-bonding of those components.

Figure 3:
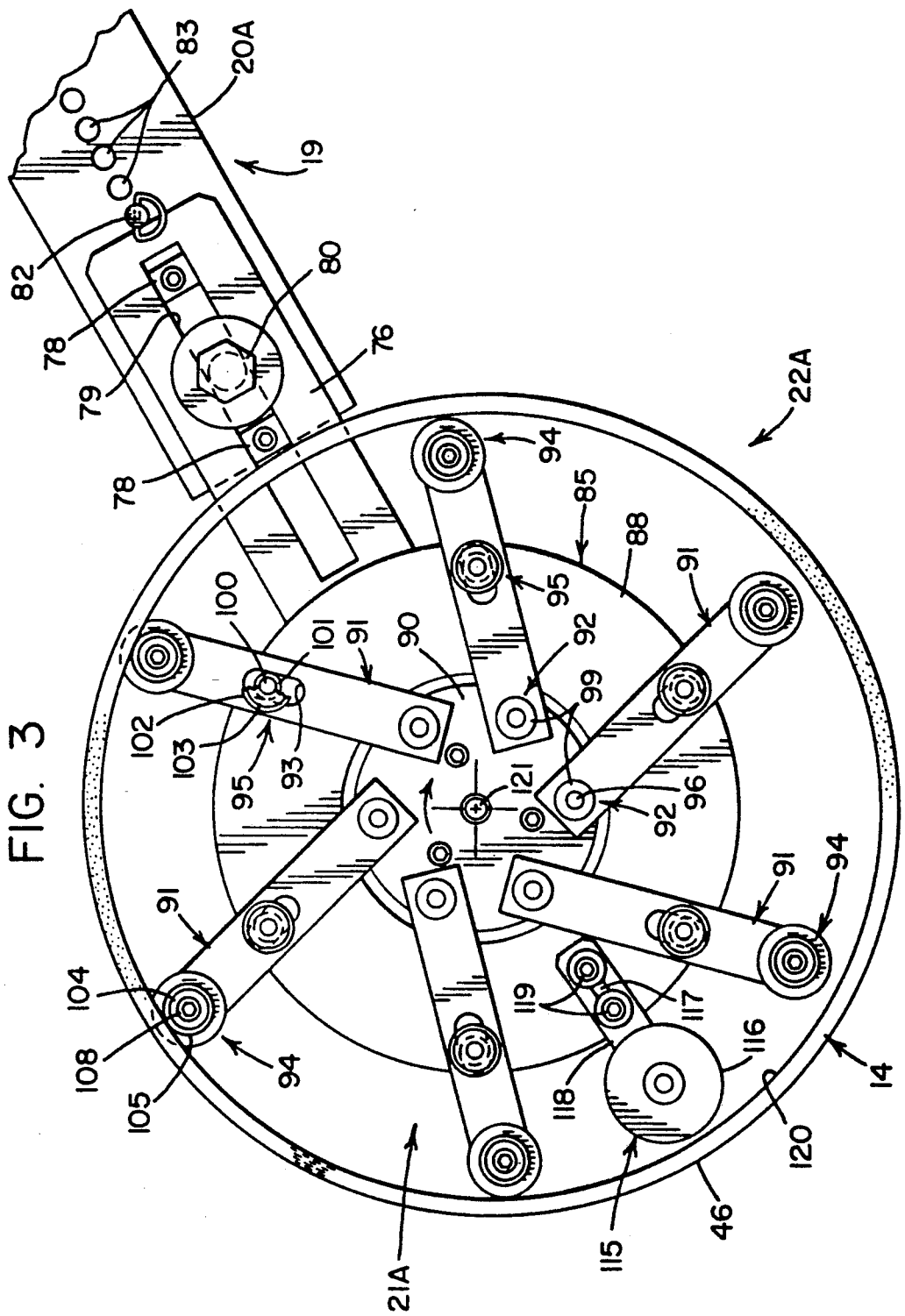
FIG. 3 is an enlarged area of FIG. 1 depicting a mounting chuck employed to grip the bead ring sub-assembly.

In order to facilitate ease of loading of the bead ring sub-assembly 14 and unloading of a completed tire bead assembly 12, respectively, onto and off of the chucks 21, the support rollers 94 presented from the radially outer ends of the drive arms 91 can be withdrawn from the radial position established by the positioning and support roller 116 to what shall be identified as the unclamped position, as depicted in FIG. 3. This withdrawal is accomplished by rotating the drive disk 90 clockwise relative to the fixedly positioned intermediate ring 88. This rotation can be accomplished by any conventional means such as an electric stepping motor, a fluid motor or a rotary solenoid. Such devices are believed to be well known to those skilled in the art as are the methods of mounting and powering such devices. In the exemplary embodiment depicted, the drive disk 90 is connected to an output shaft 121 (FIG. 7) of a conventional rotary solenoid 89. The rotary solenoid 89 is disposed within the hollow interior of the cylindrical portion 86 of the chuck frame 85, and a plurality of threaded stems 123 extend outwardly from the frame 124 of the rotary solenoid 89 to be received through openings 125 provided in the chuck frame 85. A nut 126 is threaded on each stem 123 to secure the rotary solenoid 89 to the chuck frame 85.

The rotary solenoid 89 is selectively activated to rotate the drive disk 90 counterclockwise to effect the expanded, or clamping position, of the chuck 21 (FIG. 6), and conversely the rotary solenoid may be deactivated to rotate the drive disk 90 clockwise to effect the contracted, or releasing position, of the chuck 21 (FIG. 3).

The amount of counterclockwise rotation of the drive disk 90 is determined by the diameter of the bead ring sub-assembly 14 received thereon. As the diameter of the bead ring sub-assembly 14 increases, the roller assemblies 94 on the drive arms 91 will be extended further outwardly. The maximum diameter that can be achieved by the chuck 21 is established when the drive arms 91 are disposed radially from the center of the drive disk 90.

The drive arms 91 are retracted—i.e.: the chuck is un-clamped—at the unloading station 22C. The drive arms 91 are extended—i.e.: the chuck is clamped—at the loading station 22A and the chuck 21 remains clamped at the assembly station 22B.

In order that the elastomeric strip 42 can be cut to the proper length, a conventional sensor, not shown, may be positioned to read the presence of the apex filler 13 at a specific position about the circumference of the chuck 21. As the opposed rollers 33 shape the elastomeric strip 42 into the apex filler 13 and apply the shaped apex filler 13 to the bead ring sub-assembly 14, the leading edge 128 of the elastomeric strip 42 will pass the sensor. This signals a conventional hot knife, disposed in the in-flight cutter and feed assembly 45, to cut the elastomeric strip 42 such that the proper length is provided and the apex filler 13 will not need to be stretched to complete the splice 129. The exact positioning of the sensor can be determined for each size tire bead assembly 12 that will be manufactured on the bead assembly apparatus 15. The sensor used may be a conventional device such as an optical, electrical or fluidic proximity sensor. These devices are well known such that a more elaborate discussion of them is not believed necessary at this point.

After the tire bead assembly 12 is completed at station 22B, the chuck supporting assembly 19 is rotated to:
1. present the completed tire bead assembly 12 at station 22C to be unloaded;
2. allow a new bead ring sub-assembly 14 to be loaded on the chuck 21 that is presented at the loading station 22A; and,
3. present a bead ring sub-assembly 14 at station 22B where an apex filler 13 can be applied thereto.

This completes the assembly cycle which may be repeated as often as as often as necessary to provide the desired number of tire bead assemblies 12.

SUMMARY

A linear, elastomeric strip 42 is extruded from the extruder 43 and is directed through an accumulator 44—which may be in the configuration of the commonly designated "dancer" or "festoon"—from which the strip 42 is delivered, by an in-flight cutter and feeder assembly 45, to the nip 35 presented between a pair of opposed, rotating rollers 33. While the elastomeric strip 42 is between the rollers it is worked from a linear to an annular configuration. Because the rollers 33 provide an incrementally increasing speed differential from the base 49 to the radially outer edge 50 of the elastomeric strip 42 within the nip 35 the outer edge 50 has a greater linear speed than the base 49. The elastomeric strip 42 is worked by that speed differential. Because the speed differential increases proportionally to the distance between the base 49 and the outer edge 50, the strip 42 is stretched, or elongated, proportionally to that speed differential. Thus, the present invention forms an apex filler 13 that does not have internal stresses which cause it to bow, buckle, fold, dish or scallop. Simply stated the annular apex filler 13 is of the correct circumferential length at all radial positions thereof.

When the apex filler 13 is being worked it may also be applied to the radially outermost surface 46 on a bead ring sub-assembly 14. In that situation the radially inner periphery 49 of the elastomeric strip 42 which becomes the apex filler 13 is forced into abutment with the radially outer surface 46 of the bead ring sub-assembly 14. Because both the bead ring sub-assembly 14 and elastomeric strip 42 have a tacky, rubber surface they are readily tack-bonded to each other by the pressure with which the apex filler 13 is applied to the bead ring sub-assembly 14.

The elastomeric strip 42 is cut by the in-flight cutter and feeder assembly 45 when the proper length has been extruded, which occurs when the linear length of the elastomeric strip 42, measured along the base 49, is equal in circumferential dimension of the bead ring sub-assembly, measured along the radially outer surface 46 thereof. Because it is undesirable to stop the extrusion process, an accumulator 44 is used to accommodate the continued extrusion while the remainder of the elastomeric strip 42 is applied to a bead ring sub-assembly 14. By providing a loading station 22A, an assembly station 22B and an unloading station 22C on a rotatable chuck supporting assembly 19, minimum wait time occurs between the cutting operation and the positioning of a new bead ring sub-assembly 14 at the assembly station 22B. Thus, the accumulator 44 need only accommodate a minimum length of the extrudate, particularly when the extrusion time is established to be very close to the assembly time.

The mounting chucks 21 are provided to permit rapid loading of the bead ring sub-assembly 14 and unloading of the completed tire bead assembly 12. The mounting chucks 21 also support the bead ring sub-assembly 14 for rotation during the application of the elastomeric strip 42 to the bead ring sub-assembly.

The foregoing description of the exemplary embodiments of not only the apex filler forming mechanism 10, which may be an independent article of commerce, but also the apex filler applying apparatus 11, which is particularly adapted to operate in conjunction with the apex filler forming mechanism 10, has been presented for the purposes of illustration and description. The description of the exemplary embodiments is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

As should now be apparent, the present invention not only teaches a method and apparatus for forming an elastomeric strip into an apex filler of substantially annular configuration without inducing distortion in the resulting apex filler as well as a method and apparatus for applying such an apex filler to a bead ring subassembly—both methods and apparatus embodying the concepts of the present invention—but also that the other objects of the invention can likewise be accomplished.

We claim:

1. A method of forming an apex filler and also applying the apex filler onto a ring sub-assembly, said method comprising:
   mounting a ring sub-assembly on a roller chuck, the ring sub-assembly having a substantially annular inner periphery adapted to be contacted by roller members on the chuck, a substantially annular outer periphery and a pair of laterally spaced sidewalls joining the inner and outer surfaces;
   extruding a substantially linear elastomeric strip having an apex, a base and a pair of sidewalls converging between the base and the apex such that the elastomeric strip is narrower at the apex than at the base;
   engaging the sidewalls of the ring sub-assembly and the sidewalls of the elastomeric strip with a pair of opposed, driven frusto-conical rollers, the base of the elastomeric strip being forced into contact with the outer periphery of the ring sub-assembly to effect at least temporary tacking therebetween;
   pressing the elastomeric strip between the frusto-conical rollers while causing rotation of the ring sub-assembly and the base of the elastomeric strip at a first linear speed, the apex at a second, and greater, linear speed and the sidewall of the elastomeric strip at a linear speed substantially proportional to the distance from the base to the apex,
   thereby elongating the elastomeric strip in a radially differential manner as determined by the frusto-conical rollers to form an annulus circumferentially about the ring sub-assembly with the base of the elastomeric strip having a linear dimension equal to the circumference of the outer, substantially annular periphery of the ring sub-assembly and the apex of the elastomeric strip having a linear dimension sufficient to form a substantially stress-free annulus; and,
   splicing the ends of the elastomeric strip to close the annulus.

2. A method, as set forth in claim 1, wherein:
   said ring sub-assembly is annular; and,
   said inner and said outer peripheries are substantially cylindrical.

3. A method of forming an apex filler and also applying the apex filler onto a bead ring sub-assembly, said method comprising:
   mounting a bead ring sub-assembly on a roller chuck, the bead ring sub-assembly having a substantially annular inner periphery adapted to be contacted by roller members on the chuck, a substantially annular outer periphery and a pair of laterally spaced sidewalls joining the inner and outer surfaces;
   extruding a substantially linear elastomeric strip having an apex, a base and a pair of converging sidewalls which extend between the base and the apex;
   engaging the sidewalls of the bead ring and the sidewalls of the elastomeric strip with a nip presented from a pair of opposed, driven frusto-conical rollers to force the base of the elastomeric strip into contact with the outer periphery of the bead ring;
   directing the elastomeric strip between the frusto-conical rollers while causing rotation of the bead ring sub-assembly base at a first linear speed, the apex thereof at a second, and greater, linear speed and the sidewalls of the elastomeric strip at a linear speed substantially proportional to the distance from the base to the apex; and,
   thereby progressively elongating the elastomeric strip radially outwardly of the base to form an annulus around the bead ring with the base of the elastomeric strip having a linear dimension equal to, and being bonded with, the circumference of the outer periphery on the bead ring sub-assembly, the apex having a linear dimension sufficient to form a continuous annulus.

4. A method, as set forth in claim 3, wherein:
   said ring sub-assembly is annular; and
   said inner and said outer peripheries are substantially cylindrical.

* * * * *